(12) United States Patent
Madsen

(10) Patent No.: US 12,305,614 B2
(45) Date of Patent: May 20, 2025

(54) APPARATUS, TRANSPORT SYSTEM AND METHOD FOR TRANSPORT OF AN OBJECT IN A WIND TURBINE

(71) Applicant: Siemens Gamesa Renewable Energy A/S, Brande (DK)

(72) Inventor: Peder Flodgaard Madsen, Esbjerg (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 192 days.

(21) Appl. No.: 17/917,581

(22) PCT Filed: Apr. 1, 2021

(86) PCT No.: PCT/EP2021/058598
§ 371 (c)(1),
(2) Date: Oct. 7, 2022

(87) PCT Pub. No.: WO2021/209271
PCT Pub. Date: Oct. 21, 2021

(65) Prior Publication Data
US 2023/0142192 A1    May 11, 2023

(30) Foreign Application Priority Data
Apr. 15, 2020 (EP) .................................. 20169598

(51) Int. Cl.
*F03D 13/40*        (2016.01)
*B65G 7/02*         (2006.01)

(52) U.S. Cl.
CPC .............. *F03D 13/40* (2016.05); *B65G 7/02* (2013.01); *F05B 2260/02* (2013.01)

(58) Field of Classification Search
CPC . F03D 80/50; F03D 13/40; B65G 7/02; F05B 2260/02; F05B 2230/61
See application file for complete search history.

(56) References Cited

U.S. PATENT DOCUMENTS 7,850,418 B2 * 12/2010 Niehues .................. F03D 13/20
                                                  415/121.3
10,119,523 B2 * 11/2018 Dhinakaran ............ F03D 13/10
(Continued)

FOREIGN PATENT DOCUMENTS

CN      110168221 A      8/2019
DE        1808337 A1     5/1970
(Continued)

OTHER PUBLICATIONS

International Search Report & Written Opinion for PCT/EP2021/058598, mailed on Jul. 16, 2021.

*Primary Examiner* — Eldon T Brockman
(74) *Attorney, Agent, or Firm* — Schmeiser, Olsen & Watts LLP

(57) ABSTRACT

An apparatus for transport of an object in a wind turbine is provided, the apparatus including a main frame, a number of support elements, and a number of transfer bearings attached to the main frame. The support elements are configured to receive the object and to secure the object at the main frame, and the transfer bearings each comprise a movable part that is movable around at least two axes relative to the main frame. Further, a transport system and a method for transport of an object in a wind turbine is also provided.

10 Claims, 2 Drawing Sheets

(56) References Cited

Figure 1:
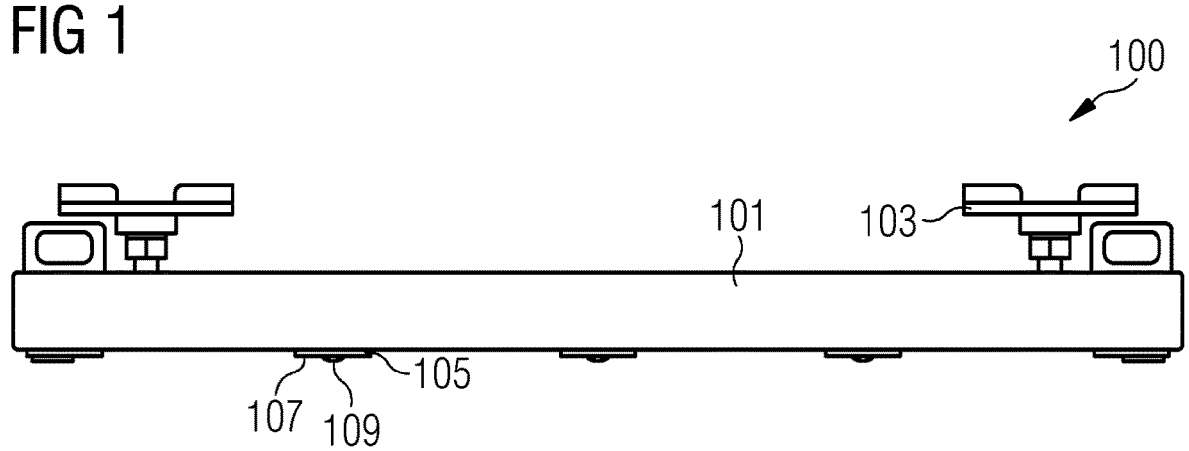

U.S. PATENT DOCUMENTS 10,138,865 B2 * 11/2018 Larsen .................... B66C 13/18
2019/0368473 A1    12/2019 Soerensen

FOREIGN PATENT DOCUMENTS

| GB | 2 569 949 A | 7/2019 |
|----|-------------|--------|
| JP | 2004189058 A | 7/2004 |

* cited by examiner

APPARATUS, TRANSPORT SYSTEM AND METHOD FOR TRANSPORT OF AN OBJECT IN A WIND TURBINE

CROSS-REFERENCE TO RELATED APPLICATIONS

This application claims priority to PCT Application No. PCT/EP2021/058598, having a filing date of Apr. 1, 2021, which claims priority to EP Application No. 20169598.8, having a filing date of Apr. 15, 2020, the entire contents both of which are hereby incorporated by reference.

FIELD OF TECHNOLOGY

The following relates to an apparatus, a transport system and a method for transport of an object in a wind turbine.

BACKGROUND

For assembly or for service of wind turbines, heavy objects, such as a switchgear have to be moved through an opening inside a wind turbine and further at a predetermined position inside the wind turbine.

Objects can be moved inside a wind turbine using a carrier moving on a rail. For moving the carrier on the rail, cylindrical elements are known that allow for moving the carrier along a single axis along the rail. Thus, the carrier can only be moved along a single axis predetermined by the rail connecting a position outside the wind turbine, where the carrier is provided, and a position within the wind turbine lying on the axis along which the rail extends.

GB 2 569 949 A describes a method and a crane kit for handling a wind turbine component in a nacelle of a wind turbine.

DE 18 08 337 A1 describes a transport wagon that is movable on a set of rails along two different axes.

SUMMARY

An aspect relates to a possibility to move a heavy object to a door for entering a wind turbine and to move the object to a decentralized position inside the wind turbine.

Thereby, the features and details described in connection with the apparatus apply in connection with the transport system and the method, so that the disclosure of the individual aspects of embodiments of the invention can be referred to one another.

According to a first aspect of embodiments of the invention, an apparatus for transport of an object in a wind turbine is disclosed. The apparatus comprises a main frame, a number of support elements, and a number of transfer bearings attached to the main frame. The support elements are configured to receive the object and to secure the object at the main frame, and each of the transfer bearings comprises a movable part that is movable around at least two axes relative to the main frame.

In the context of embodiments of the present invention, a transfer bearing may be an element that comprises a fixed part for coupling to a main frame, for example, and a movable part that moves relative to the fixed part.

In the context of embodiments of the present invention, a support element may be a receiving structure, such as a flat element or an element that is positively fitting to a shape of an object to be moved. A support element may comprise securing means, such as fasteners or magnets, for example.

The apparatus described herein is based on the principle that transfer bearings are used to move the apparatus along a rail system. As the transfer bearings of the apparatus disclosed herein are movable around at least two axes, the apparatus is movable around two axes as well. This means that the apparatus can be moved from a first direction to a second direction along a first axis and, additionally, be moved from a third direction to a fourth direction along a second axis. In other words, the apparatus can change its moving direction.

As the apparatus can move around at least two axes, the apparatus can move along a first axis along which a rail extends from an outer point of a wind turbine to an inner point of the wind turbine. After being moved to the inner point of the wind turbine, the apparatus can be moved along a second axis which may extend to a decentralized position in the wind turbine towards a service door, for example.

For changing directions during movement of the apparatus, i.e., for transferring the apparatus from a movement along a first axis to a movement along a second axis being different from the first axis, the transfer bearings, in particular the movable parts of the transfer bearing of the apparatus, may be moved in first direction and afterwards in a second direction. Thus, as the movable parts of the transfer bearings change their moving direction, an orientation of the main frame may remain as it is. This means that an object to be moved by the apparatus may be placed on the support elements of the apparatus in a final orientation as needed in the wind turbine, independent from an orientation of the transfer bearings.

According to an example, the movable part is a roller ball.

In the context of embodiments of the present invention, a roller ball may be a sphere that moves in a housing of a transfer bearing.

By using a roller ball, the apparatus is movable in multiple directions along multiple, i.e., at least two, axes.

The roller ball may be made from solid materials, such as metal or hard plastic. A solid material may transfer potential energy provided by a user or a drive device directly into kinetic energy for moving the apparatus.

Alternatively, the roller ball may be made from elastic materials, such as gum or soft plastic. An elastic material may compensate bumps during movement of the apparatus caused by rough rails, for example. Thus, a roller ball made from elastic materials may help to secure an object at the apparatus disclosed herein.

According to an example, the apparatus comprises a drive unit and/or a brake unit for controlling a movement of the apparatus, wherein the drive unit is configured to drive the transfer bearings in a first direction along a first axis and along at least a second axis.

For moving the apparatus disclosed herein, a user may push or pull the apparatus. Alternatively, a drive unit and/or a brake unit may be used that is brought into engagement with at least one movable part of the transfer bearings.

According to a first aspect of embodiments of the invention, a transport system for transport of an object in a wind turbine is disclosed. The transport system comprises an embodiment of the apparatus disclosed herein and a rail system. The rail system comprises a first set of rails extending along a first axis and second set of rails extending along a second axis, wherein the first axis and the second axis are offset to one another. Further, the apparatus is configured to move from a first direction towards a second direction along the first set of rails and to move from a third direction towards a fourth direction along the second set of rails.

By using a transport system comprising two sets of rails and an apparatus for moving an object, the object can be moved along a trajectory that extends along two axes.

A set of rails may comprise a number of single rails that are connected to build a monorail system or a plurality of rails, in particular two rails in parallel to build a parallel rail or dual rail system.

The first set of rails and the second set of rails of the transport system disclosed herein are offset from each other, such that they point into different directions along different axes. This means that as the apparatus moves from the first set of rails to the second set of rails, the apparatus changes its moving direction. Accordingly, by using the rail system of the transport system described herein, complex trajectories for moving the apparatus and an object secured at the apparatus along multiple axes. In particular, the rail system allows for moving the apparatus towards a door for entering a wind turbine, moving the apparatus into the wind turbine and moving the apparatus inside the wind turbine to a predetermined position that may offset from a central point of the wind turbine and offset from an axes along which the apparatus moves into the wind turbine.

According to an example, the first set of rails and the second set of rails are perpendicular or basically perpendicular with respect to each other.

The first set of rails and the second set of rails may be offset from each other in any angle. In particular, the first set of rails and the second set of rails may be offset from each other by 90 degrees, i.e., the first set of rails may be perpendicular or basically perpendicular to the second set of rails.

According to an example, the first set of rails and the second set of rails are movable with respect to each other, wherein at least the first set of rails comprises a transport mechanism for moving the first set of rails and a securing mechanism for securing the first set of rails at a ground.

By using a movable set of rails, the first set of rails may be provided on demand. Thus, the first set of rails may be connected to the second set of rails that is fixed inside a wind turbine. The first set of rails may extend between the second set of rails and a delivery point for delivery of an object to be moved in the wind turbine. After the object has been placed on its predetermined position in the wind turbine, the first set of rails may be disconnected from the second set of rails and used at another wind turbine. Of course, the second set of rails may be disassembled and used at another wind turbine as well.

For moving a set of rails quickly, the set of rails may comprise a transport mechanism, such as a number of transfer bearings or wheels.

For securing a set of rails, i.e., for blocking movement of a set of rails, the transport mechanism may comprise a separate securing mechanism that is brought into contact with a ground level. Alternatively, the transport mechanism may be blocked or retracted in order to block movement of the set of rails.

According to an example, the transport system comprises a coupling mechanism for coupling the first set of rails and the second set of rails.

For moving the apparatus of the transport system disclosed herein safely from the first set of rails on the second set of rails, a coupling mechanism may be used that mechanically couples the first set and the second set of rails. The coupling mechanism may comprise a set of fasteners that are configured to connect the first set of rails and the second set of rails. Alternatively, or additionally, the coupling mechanism may comprise at least one rail element in which the transfer bearings of the apparatus can be moved for changing their moving direction. The at least one rail element may be configured to guide particular transfer bearing from a first set of rails to a second set of rails.

According to an example, wherein the rails of the first set of rails and at least one rail of the second set of rails overlap each other.

By using of overlapping rails, a secure transit of transfer bearings from a first set of rails to a second set of rails can be provided. In an overlapping region of a rail of the first set of rails and the second set of rails a transfer bearing traveling along a first axis, thereby moving around a first axis with respect to the main frame of the apparatus, may be stopped and urged to travel along a second axis, thereby moving around a second axis with respect to the main frame. Thus, as the transfer bearing is stopped, the transfer bearing may contact both, a rail of the first set of rails and a rail of the second set of rails.

According to an example, the rails of the first set of rails and the second set of rails each comprise a guide that guides the apparatus along the rails as the apparatus moves along the rails, wherein the guide is at least partially omitted at areas where the first set of rails and the second set of rails overlap each other.

In order to exclude a movement of the transfer bearing of the apparatus away from particular rails, a guide may be used, such as a U-shaped recess, in which a roller ball may be moved, for example. As an overlap of guides of two different sets of rails would limit the movement of the transfer bearings over burden, the guide may be omitted at such overlapping areas for at least one rail. By omitting the guide or the guides, a transfer bearing may move away from a first set of rails and along a second set of rails. Thus, an overlapping area where a guide or multiple guides are omitted may form an interface for receiving a transfer bearing or at least the movable part of a transfer bearing.

According to a third aspect of embodiments of the present invention, a method for transport of an object in a wind turbine is disclosed. The method comprises a first moving step for moving an embodiment of the apparatus disclosed herein under the object, a securing step for securing the object at the apparatus, and a second moving step for moving the apparatus along a rail system of an embodiment of the transport system disclosed herein, comprising moving the apparatus along the first set of rails, and moving the apparatus along the second set of rails.

BRIEF DESCRIPTION

Figure 2:
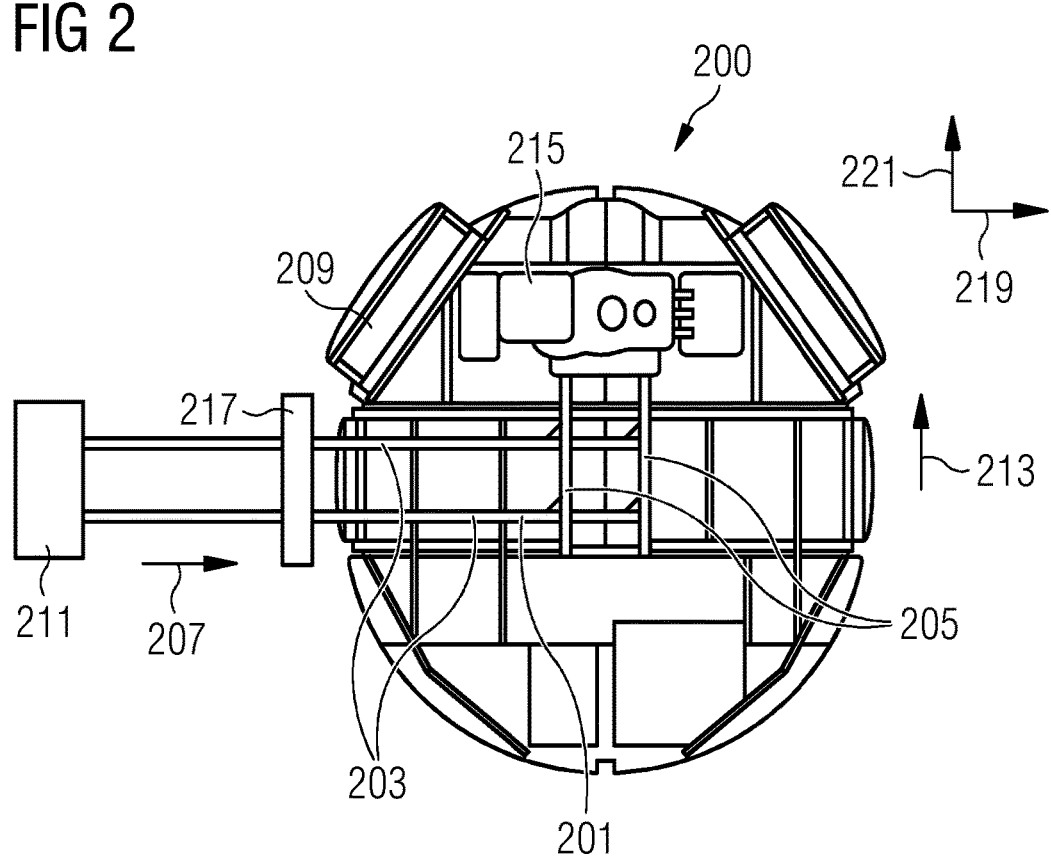
Figure 3:
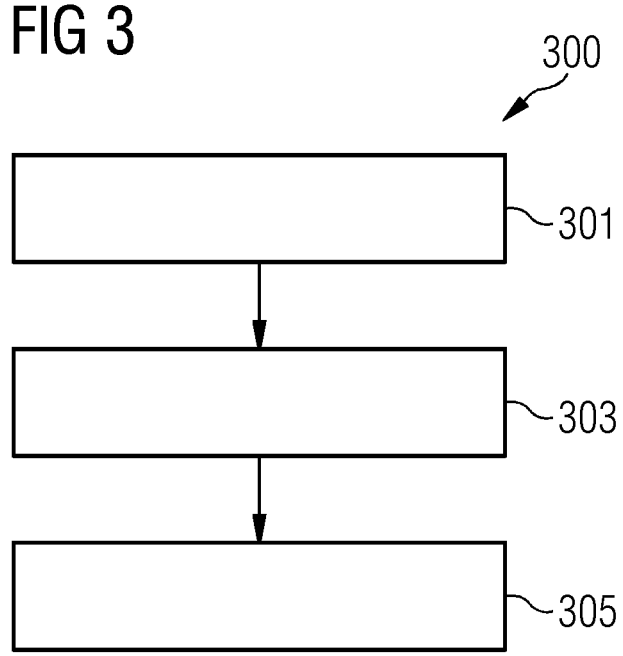
Figure 4:
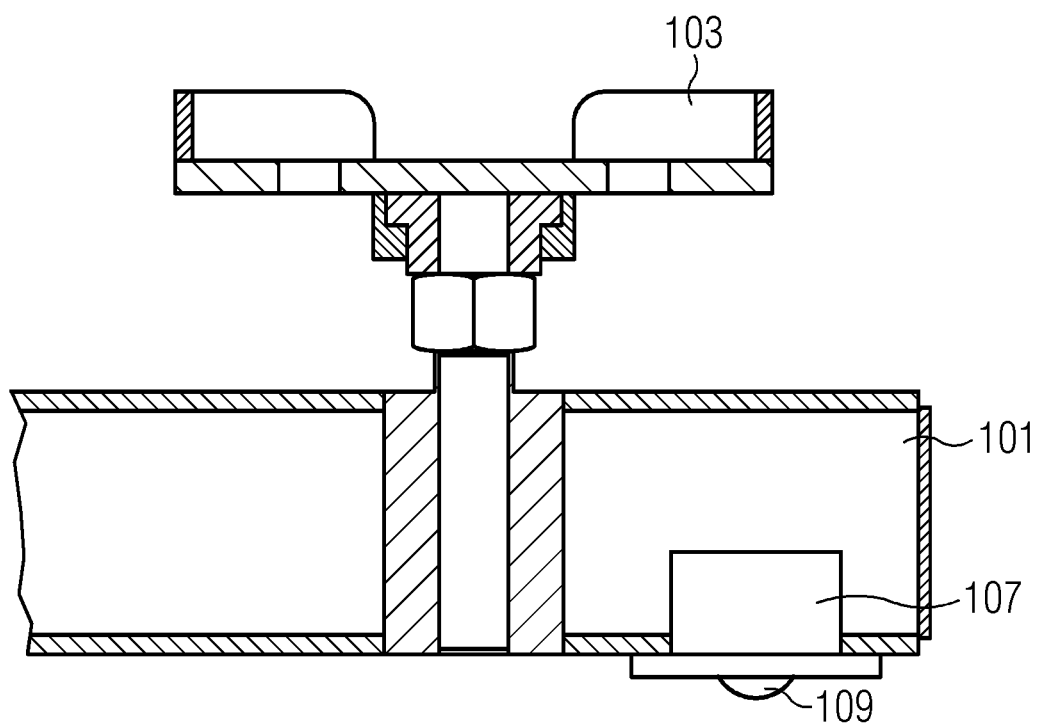

Some of the embodiments will be described in detail, with reference to the following figures, wherein like designations denote like members, wherein:

FIG. 1 shows an apparatus according to an embodiment;
FIG. 2 shows a transport system according to an embodiment;
FIG. 3 shows a method according to an embodiment; and
FIG. 4 shows a detailed view of a transfer bearing.

DETAILED DESCRIPTION

In FIG. 1, an apparatus 100 is shown. The apparatus 100 comprises a main frame 101, support elements 103 and transfer bearings 105.

The transfer bearing 105 comprises a housing 107 and a movable part 109, which is here drawn as a roller ball.

As the roller balls can move in every direction, the apparatus 100 can also move in every direction using the movable parts 109.

For securing of objects to be moved at the apparatus 100, the support elements 103 are provided. Thus, an object 215 is placed at the support elements 103 and moved together with the apparatus 100 along a predetermined trajectory, wherein the trajectory may comprise two axes that are offset from each other.

In FIG. 2 the apparatus 100 as shown in FIG. 1 as part of a transport system 200 in combination with a rail system 201.

The rail system 201 comprises a first set of rails 203 and a second set of rails 205.

The second set of rails 205 extends from third direction towards a fourth direction along a second axis, as indicated by arrow 207 inside a wind turbine 209, whereas the first set of rails 203 extends from a first direction towards a second direction along a first axis from a delivery point 211, as indicated by arrow 213. At the delivery point 211 an object 215 is delivered together with the apparatus 100 by a crane on a ship, for example. Using the apparatus 100, the object 215 can be moved through a door 217 of the wind turbine 209 to the second set of rails 205.

As the first set of rails 203 and the second set of rails 205 are connected, the apparatus 100 and the object 215 can be moved from the first set of rails 203 to the second set of rails 205.

As the apparatus 100 moves along the first set of rails 203, the movable parts 109 of the apparatus 100 move around a first axis 219 relative to the main frame 101.

As the apparatus 100 moves along the second set of rails 205, the movable parts 109 of the apparatus 100 move around a second axis 221 relative to the main frame 101.

In FIG. 3 a method 300 for transport of an object in a wind turbine is shown. The method 300 comprises a first moving step 301 for moving an embodiment of the apparatus disclosed herein under the object, a securing step 303 for securing the object at the apparatus, and a second moving step 305 for moving the apparatus along a rail system of an embodiment of the transport system disclosed herein, comprising moving the apparatus along the first set of rails, and moving the apparatus along the second set of rails.

In the first moving step 301, the object may be lifted using a lifting element, such as a hydraulic cylinder, for example. Alternatively, the object may be placed at a platform with an opening for receiving the apparatus, such that the apparatus can be lifted by using a hydraulic cylinder or a lifting mechanism, for example.

In the securing step 303, the object may be secured at the support elements using fasteners, for example. The support elements may additionally or alternatively have a surface that minimized movement of the object by providing a high friction force between the surface and the object.

In FIG. 4, a transfer bearing 105 according to FIG. 1 is shown in detail. Here, the movable part 109 is a sphere or a ball moving in the housing 107. As the housing 107 is fixed at the main frame 101, the movable part 109 is movable relative to the housing 107 and the main frame 101.

Since the movable part 109 is not secured in the housing 107 using an axle but using a shape of the housing with an opening that is slightly smaller than a diameter of the movable part, the movable part 109 is not limited in its moving directions. This means that the movable part 109 can move in at least two axes and four directions with respect to the main frame 101. Optionally, the movable part 109 may be in contact with the housing 107 via a number of balls, thereby forming a ball bearing.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. An apparatus for transport of an object in a wind turbine, the apparatus comprising:
   a main frame,
   a number of support elements on top of the main frame,
   a number of transfer bearings attached to the main frame,
   wherein the support elements are configured to receive the object and to secure the object at the main frame on the support elements, and
   wherein the transfer bearings each comprise a movable part that is movable around at least two axes relative to the main frame,
   wherein the apparatus is configured to be moved in a first direction along a first axis using the number of transfer bearings attached to the main frame and, additionally, be moved in a second direction along a second axis using the number of transfer bearings attached to the main frame.

2. The apparatus according to claim 1, wherein the movable part is a roller ball.

3. The apparatus according to claim 1, wherein the apparatus comprises a drive unit and/or a brake unit for controlling a movement of the apparatus, wherein the drive unit is configured to drive the transfer bearings in the first direction along the first axis and along at least the second axis.

4. A transport system for transport of an object in a wind turbine, the transport system comprising:
   an apparatus according to claim 1,
   a rail system,
   wherein the rail system comprises a first set of rails extending along a first axis and second set of rails extending along a second axis,
   wherein the first axis and the second axis are offset to one another, and
   wherein the apparatus is configured to move from a first location towards a second location along the first set of rails using the number of transfer bearings attached to the main frame and to move from a third location towards a fourth location along the second set of rails using the number of transfer bearings attached to the main frame,
   wherein the first set of rails and the second set of rails are movable with respect to each other, and
   wherein at least the first set of rails comprises a transport mechanism for moving the first set of rails and a securing mechanism for securing the first set of rails at a ground.

5. The transport system according to claim 4, wherein the first set of rails and the second set of rails are perpendicular or basically perpendicular with respect to each other.

6. The transport system according to claim 4, wherein the transport system comprises a coupling mechanism for coupling the first set of rails and the second set of rails.

7. The transport system according to claim 4, wherein the rails of the first set of rails and at least one rail of the second set of rails overlap each other.

8. The transport system according to claim 4, wherein the rails of the first set of rails and the rails of the second set of rails each comprise a guide that guides the apparatus along the rails as the apparatus moves along the rails, and wherein the guide is at least partially omitted at areas where the first set of rails and the second set of rails overlap each other.

9. The transport system according to claim 8, wherein the guide is a recess in each of the rails.

10. A method for transport of an object in a wind turbine, the method comprising:
   providing an apparatus having a main frame, a number of support elements on top of the main frame, and a number of transfer bearings attached to the main frame, wherein the support elements are configured to receive the object and to secure the object at the main frame on the support elements, wherein the apparatus is configured to be moved in a first direction along a first axis using the number of transfer bearings attached to the main frame and, additionally, be moved in a second direction along a second axis using the number of transfer bearings attached to the main frame;
   providing a rail system, wherein the rail system comprises a first set of rails extending along the first axis and second set of rails extending along the second axis, wherein the first axis and the second axis are offset to one another;
   moving the apparatus under the object;
   securing the object at the apparatus; and
   moving the apparatus along a rail system of a transport system including moving the apparatus along the first set of rails and moving the apparatus along the second set of rails.

* * * * *